United States Patent [19]
Malinge et al.

[11] Patent Number: 4,776,663
[45] Date of Patent: Oct. 11, 1988

[54] DISCONNECTABLE COLLIMATION ASSEMBLY

[75] Inventors: Jean L. Malinge, Sevres; Philippe Pouyez, Colombes; Roland Desmurs, Saint Cloud, all of France

[73] Assignee: 501 Socapex S.A., Surenes, France

[21] Appl. No.: 939,371

[22] Filed: Dec. 8, 1986

[30] Foreign Application Priority Data

Dec. 12, 1985 [FR] France .................. 85 18427

[51] Int. Cl.$^4$ .................................. G02B 6/38
[52] U.S. Cl. .......................... 350/96.20; 350/96.18
[58] Field of Search ............ 350/96.18, 96.20, 96.21

[56] References Cited

U.S. PATENT DOCUMENTS

| | | | |
|---|---|---|---|
| 4,204,743 | 5/1980 | Etaix | 350/96.20 |
| 4,447,119 | 5/1984 | Beasley | 350/96.20 |
| 4,575,181 | 3/1986 | Ishikawa | 350/96.20 |

FOREIGN PATENT DOCUMENTS

| | | | |
|---|---|---|---|
| 0006662 | 1/1980 | European Pat. Off. | |
| 0129456 | 12/1984 | European Pat. Off. | |
| 2353069 | 12/1977 | France | |
| 3323653 | 11/1984 | Fed. Rep. of Germany | 350/96.20 |
| 3327575 | 2/1985 | Fed. Rep. of Germany | 350/96.20 |
| 0239280 | 9/1986 | German Democratic Rep. | 350/96.20 |
| 0014102 | 1/1983 | Japan | 350/96.20 |

OTHER PUBLICATIONS

Conference Europeene Sur Les Communications Optiques (Sep. 21-24, 1982, pp. 3341-343).

*Primary Examiner*—Gene Wan
*Attorney, Agent, or Firm*—Bacon & Thomas

[57] ABSTRACT

The present invention relates to a disconnectable collimation assembly designed to transmit a light beam toward a device to be connected. The assembly comprises a base having a plane of reference strictly parallel to a plane of reference of the device to be connected, a sleeve mounted in the base and supporting a centering device holding a bar-lens, the lens being adjusted so that its optical axis will be in a predetermined position relative to the plane of reference.

12 Claims, 3 Drawing Sheets

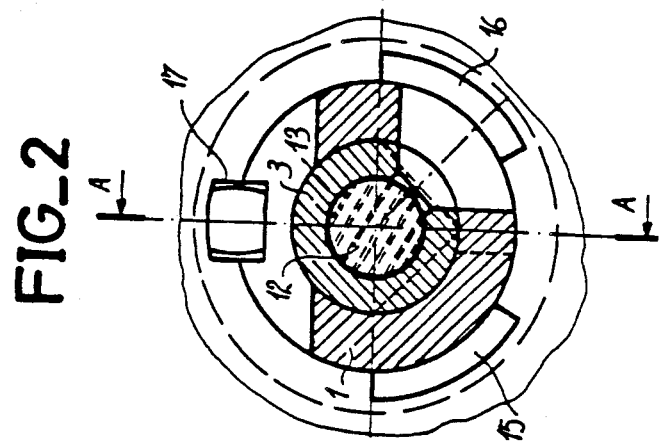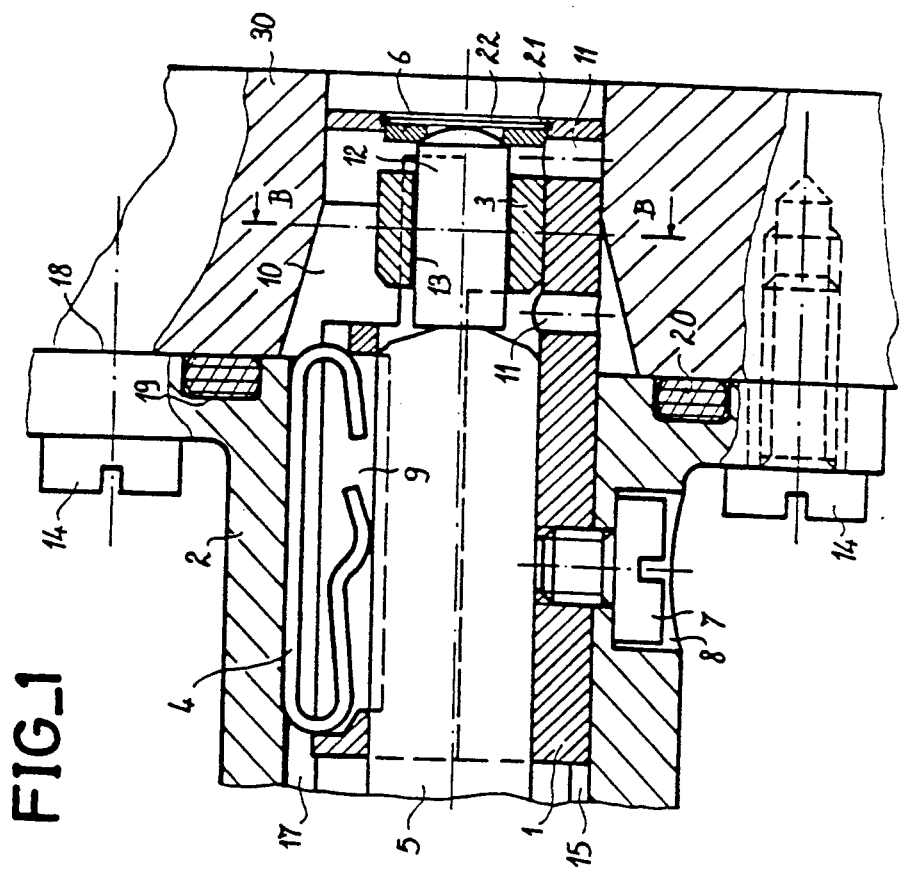

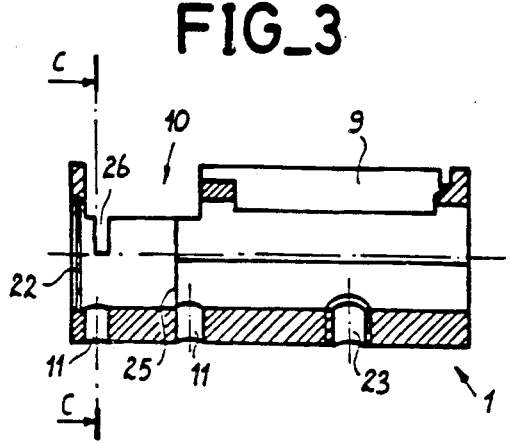
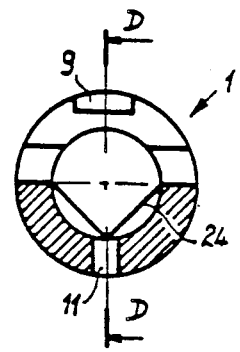
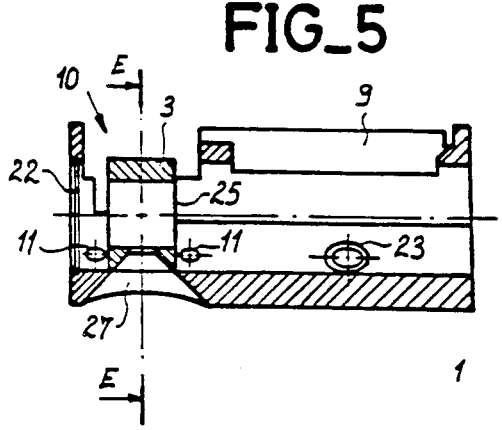
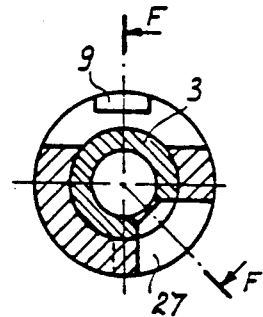
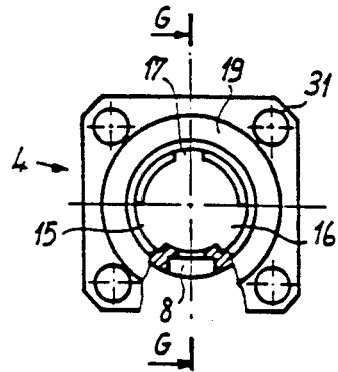
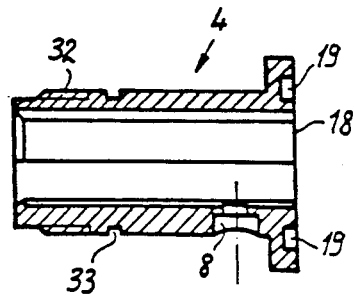

FIG_9
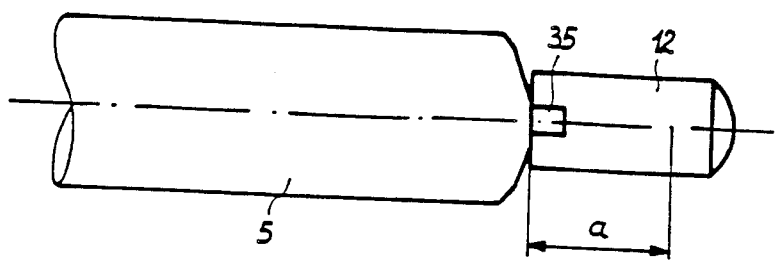
FIG_10
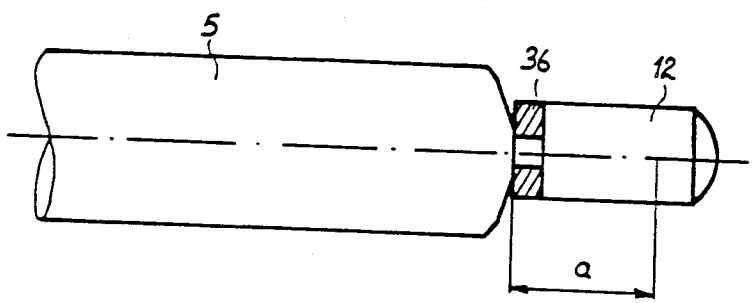
FIG_11
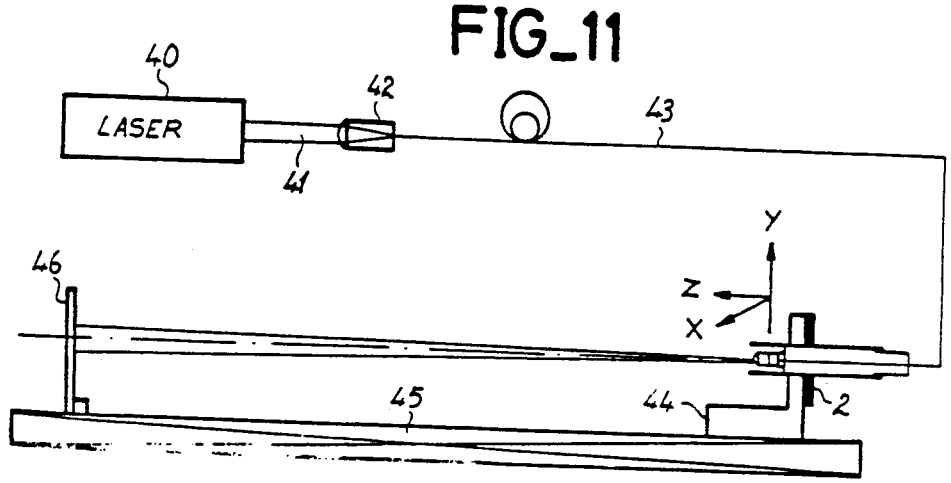

DISCONNECTABLE COLLIMATION ASSEMBLY

BACKGROUND OF THE INVENTION

1. Field of the Invention

This invention relates to a disconnectable collimation assembly which makes it possible to ensure access to any optical component requiring a separation between fibers without producing excessive attenuation.

2. Description of the Prior Art

It is often necessary to break an optical line in order to insert systems for switching, picking up, injecting or attenuating signals. The direct use of the light emanating from an optical fiber is awkward. As a matter of fact, the beams are then divergent and the insertion of the systems is obtained at the cost of high losses and of mechanical precision. For example, the act of longitudinally separating two fibers with a diameter of $50/125\mu$ by a distance of $7\mu$ results in a loss of 0.5 dB as well as an angular misalignment of 1.5 degrees. To separate the ends of the fibers in a consistent fashion, it is sufficient to collimate the beams between two lenses of the planoconvex type, the ends of the fibers being placed at the respective focal point of each lens. With these conditions, the front face of the lenses can be separated by about 30 mm. With the use of lenses of the glass bar type, the insertion loss is then 1.5 db for fibers of $50/125\mu$. This system tolerates an axial misalignment on the order of 0.1 mm and admits of a less precise embodiment. But the system remains as sensitive as the direct fiber-to-fiber connection with respect to angular misalignment.

Due to this sensitivity of the angular alignment, known devices are non-removable, one-piece optical points permanently inserted in the system, and require factory adjustment of the fiber-lens coupling. The manufacturers of optical equipment generally provide their components equipped with a certain length of optical fiber (commonly called a "pig-tail" in the art), which prevents the users from easily creating their own collimation assembly. There also exists an embodiment of disconnectable optical points but they are always integrated in the body of a specific component.

It would be desirable to provide a disconnectable collimate assembly which did not have the above disadvantages.

SUMMARY OF THE INVENTION

In accordance with the present invention, there is provided a disconnectable collimation assembly designed to transmit a light beam toward a device to be connected, the beam being transmitted by means of a plug equipped with a tip, characterized in that it comprises:

a base having a plane of reference strictly parallel to a plane of reference of the device to be connected, a sleeve mounted in the base and designed to receive the tip, means of positioning the plug and its tip in the collimation assembly, a centering device placed in alignment with the tip and held by the sleeve, and optical collimation means of the light beam to be transmitted disposed in the centering device, the optical means being adjusted so that its optical axis will be in a predetermined position relative to the plane of reference.

In order to remedy the above drawbacks, the invention proposes a disconnectable collimation assembly (or disconnectable optical point) which can be separate from any equipment and which embodies the collimation function by itself. It can be designed so as to receive standard optical tips and optical fibers with diameters ranging from $50/125\mu$ to $100/140\mu$. This collimation assembly is based on the principle of the predetermined positioning of an optical axis relative to a reference surface.

BRIEF DESCRIPTION OF THE DRAWINGS

FIGS. 1 and 2 are sectional views of the front and side of a collimation assembly according to this invention.

FIGS. 3 and 4 are views of a sleeve for a collimation assembly according to this invention.

FIGS. 5 and 6 are views of elements of the assembly according to this invention.

FIGS. 7 and 8 represent a particular element of the collimation assembly.

FIGS. 9 and 10 represent variations of lenses that can be used by this invention.

FIG. 11 is a diagram of an optimization bench for a collimation assembly according to this invention.

DESCRIPTION OF THE PREFERRED EMBODIMENTS

To precisely align two elements, an arrangement of the precision bore and shaft type could be used. However, to provide a precision bore of small diameter is expensive. As mentioned above, the coupling between two optical points is relatively forgiving as to radial and axial misalignments, which permits the use of an alignment bore without high precision and of short range. In contrast, since the coupling between optical points is very sensitive to angular misalignment, there can be used contact surfaces that are strictly parallel to one another, of large size but easy to produce. In this case, in order to obtain a good coupling, each optical axis of an optical point (the fiber-collimation assembly means) must be strictly perpendicular to its contact surface and the fiber-lens interface must be optimized. The positioning of the lens will be optimized directly within the mechanical part of the optical point, the contact face contacting the reference face of a micromanipulation tool. In so doing the influence of imprecisions of the mechanical assembly and of transfers of precision on the fiber-lens coupling are minimized.

A collimation assembly according to the invention is represented in FIGS. 1 and 2. FIG. 1 is a section along axis A—A and FIG. 2 along axis B—B. The collimation assembly includes a mechanical part and optical collimation means. The mechanical part assures the alignment of the connection of the optical fiber and the collimation means, the positioning and the fixation of the optical point on the equipment to be fitted therewith. The mechanical assembly comprises a sleeve 1 mounted in a base 2, a centering device 3 fitted in sleeve 1, a spring 4 serving to press the tip 5 of an optical plug to the bottom of its lodging, and preferably a stop washer 6. The assembly also comprises means of fixation of sleeve 1 in base 2, for example a set-screw 7 screwed directly into the sleeve, and with a head received in a recess 8 in the base.

The centering device 3 is introduced through the front of the sleeve and fitted by force. The spring is fitted in a groove 9 milled in the full thickness of the sleeve. The dimensions of the groove and its form assure the retention of the spring without letting it fall inside the sleeve. With the centering device and the spring installed, the sleeve is engaged in the bore of the base. Screw 7 assures the assembly of the unit, and its head can be encapsulated to prevent any subsequent disassembly.

The bore in the sleeve has a section formed by the junction of a circular part and a V-shaped part. This bore permits the reception and positioning of a plug whose tip 5 has a section of identical form. The positioning V is carefully machined. The sleeve has another cutaway 10 opposite two holes 11. Cutaway 10 and holes 11 permit access to the parts situated on either side of the centering device 3 when the latter is in place. They allow for passage of a lens micromanipulation tool.

Centering device 3 permits holding the collimation means, in this case a bar lens 12, in its position of optimum adjustment by gluing. It has a tubular shape and the diameter of its bore is such that it permits orienting the lens with the use of the micromanipulation tool. An adhesive joint 13 integrates the lens 12 with the centering device 3.

Base 2 provides protection for the collimation unit, its mounting on the device 30 to be connected, for example, by the use of screws 14 and the mounting of an optical plug by means of a thread located on its rear part. It also has internal error-prevention keys defined by longitudinal cavities 15, 16, and 17 to facilitate the placement of the plug. Cavity 17 also serves to accommodate spring 4. Base 2, in particular, has a strictly machined reference surface 18 which will come in contact with a reference surface of the device to be connected. A slot 19 receives a gasket 20.

It can be advantageous to equip the collimation assembly with a washer 6 to serve as a stop for lens 12. This washer will serve to diminish the force applied to adhesive joint 13 by the spring which generally is used with an optical plug. Washer 6 has one face machined so as to follow the convex face of the lens 12. It is integrated with the optical point by a peripheral adhesive joint 21. To assure a good mounting of washer 6, a small track 22 is machined in the front part of the bore in the sleeve to serve to serve as a point of attachment for peripheral joint 21.

Sleeve 1 is represented alone in FIGS. 3 and 4 which are respectively front and side views. FIG. 3 is a sectional view along axis D—D and FIG. 4 a sectional view along axis C—C. These figures permit a better understanding of the configuration of the sleeve. There can be seen groove 9, cutaway 10, two holes 11 and track 22. Threaded hole 23 permits the mounting of the sleeve in the base by means of a setscrew. The V 24 for receiving the tip extends from the rear of the sleeve to a shoulder 25 of cutaway 10. There is also seen a cutout 26 made in the wall of the sleeve extending approximately to the axis of the sleeve, which will serve for passage of a micromanipulation tool.

FIGS. 5 and 6 represent sleeve 1 equipped with centering device 3 which is force-fitted to shoulder 25. FIG. 5 is a section along axis F—F and FIG. 6 along the axis E—E passing through the middle of the centering device. When the centering device is installed in the sleeve, a flared hole 27 is formed, common to the sleeve and the centering device, for the injection of adhesive.

FIGS. 7 and 8 are front and side views of base 2. FIG. 8 is a sectional view along axis G—G. There is shown slot 19, the receptacle 8 for the screw fixing the sleeve on the base, reference face 18 and cavities 15, 16 and 17. The four holes 31 are for passage of the screws mounting the base on the device to be connected. The thread 32 of the rear part of the base permits screwing in the optical plug to be connected. A peripheral slot 33 permits the installation of a toric gasket between the base and the optical plug.

Glass lenses have the advantage of good resistance to the wear resulting from the contact of the plug tips. They can, however, be replaced by plastic lenses. In this case it is preferable to reinforce their resistance to wear as shown in FIGS. 9 and 10. In FIG. 9, wear protection is provided by an axial cavity 35 in lens 12. In FIG. 10, the protection is provided by the interposition of a metal washer 36 between the tip and the lens. Length "a" represents the focal length.

The device is assembled as follows. Sleeve 1, equipped with centering device 3 and spring 4, is introduced into base 2 and integrated with this base. Lens 12 can then be introduced followed by the operation of optimization, in which the optical axis of the collimation assembly is made strictly perpendicular to the reference face 18. This operation is carried out with an optimization bench.

FIG. 11 is a schematic view of an optimization bench for a collimation assembly according to this invention. It comprises a coherent laser 40 generating a light beam 41 toward the convex face of a bar lens 42. The laser can be a 10 mW laser generating a signal of 630 nm. Lens 42 focuses the light beam on the end of an optical fiber 43 which is 300 m in length and has a diameter of $50/125\mu$. This fiber length permits the extinction of the cladding modes. The other end of the fiber is molded very precisely inside a standard plug which will be mounted on base 2 of the future optical point. The base is integrated with a micromanipulation device 44 by four screws fitting in holes 31. The device is placed on a rigid bench 45 on which are placed, facing one another, device 44 and a screen 46 at a distance of about 1200 mm.

The first stage in the optimization operation is the establishment of the target on the screen. For this a lens is glued with no special precautions in the centering device. An optical point of poor quality is obtained, which can serve to determine the point of the target to be aimed at in order to align the lenses and the standard plug as precisely as possible. The procedure as as follows. The optical point is rotated on itself, 90° at a time. Each time, the contour of the light spot on screen 46 is traced very precisely. Then the center of the circle which circumscribes the four circles traced previously is determined geometrically. Around this center a circle is traced, with a diameter equal to that of the light spot. This circle constitutes the target to be aimed at by micromanipulating the lens in front of the standard plug. When, in the course of a manipulation, the target circle is made to merge with the light spot, the optical axis of the collimation assembly will be considered to be perpendicular to the plane of reference of the base. The lens will then be glued in its centering device. The glue is introduced through hole 27. Preferably, the glue is one which hardens under ultra-violet radiation directed toward hole 27 or through the front face of the lens.

The micromanipulation of the lens is done in all possible directions. The standard plug has a tip without a spring and hence is nonretractable. Holes 11 in the sleeve permit the passage of manipulation rods. Cutaway 10 and the cutout 26 permit the introduction of a small V held by the micromanipulation arm.

After gluing the lens, stop washer 6 can be installed and glued in turn.

Since the device to be connected has an equivalent structure (reference surface parallel to plane 18 and optical axis strictly perpendicular to this reference surface), optical losses will be reduced to a minimum.

All optical points embodied in this manner will be capable of being aligned two by two with the least possible insertion loss in the transmission of a light signal. The molding of fibers in diameters of $50/125\mu$ and $100/140\mu$ is now done with a precision of less then $\pm 3\mu$ of the theoretical reference dimensions, which makes for small variations from the lens-reference fiber coupling to the lens-utilization fiber coupling.

The invention is not limited to the type of plug described above, but can be adapted to other plugs with modification of the forms of the base or the sleeve to assure guidance of the plugs.

This type of disconnectable optical point can be used on any optical device inserted on an optical fiber line, for example on couplers, attenuators, switches, and any type of sensors.

What is claimed is:

1. A disconnectable collimation assembly for connecting the tip of an optical plug to a second element comprising
   (a) a base defining a reference plane;
   (b) a sleeve defining means to receive and position the tip of the optical plug in the collimation assembly;
   (c) means to fixedly attach the sleeve to the base;
   (d) a generally cylindrical centering device mounted on the sleeve and defining means to accommodate a lens;
   (e) an optical collimation means having an optical axis mounted in the centering device in alignment with the optical plug tip; and,
   (f) means defined by the sleeve to allow positioning of the optical collimation means such that its optical axis is perpendicular to the reference plane.

2. A collimation assembly according to claim 11 wherein the optical collimation means comprises a bar lens.

3. A collimation assembly according to claim 2, further comprising positioning the sleeve in the base comprising error prevention keys formed on the sleeve and engaging corresponding cavities formed in said base.

4. A collimation assembly according to claim 2, wherein the means for positioning said plug tip in said sleeve comprise complementary V shapes defined by the sleeve and formed on the tip.

5. A collimation assembly according to claim 4, wherein the centering device is force fitted in said sleeve.

6. The collimation assembly according to claim 4 further comprising spring means interposed between the base and the plug extending through the sleeve to bias the corresponding V-shapes into mutual contact.

7. A collimation assembly according to claim 1, wherein the means defined by the sleeve to allow positioning of the optical collimation means comprises a cutaway and holes extending laterally through the sleeve for the introduction of a tool for micromanipulation of the optical collimation means.

8. A collimation assembly according to claim 1 wherein means to fixedly attach the sleeve to the base comprises a screw extending through the base and threadingly engaging the sleeve.

9. A collimation assembly according to claim 1 further comprising a washer fixed to the sleeve and serving as a stop for the optical collimation means.

10. The collimation assembly according to claim 1 further comprising means defined by the sleeve and the centering device to allow insertion of an adhesive between the optical collimation means and the centering device to fixedly attach the optical collimation means to the centering device after its optical axis has been positioned with respect to the reference plane.

11. A method of making disconnectable collimation assembly for connecting a tip of an optical plug to a second element comprising the steps of:
    (a) providing a base defining a plane of reference;
    (b) mounting a sleeve in the base, the sleeve defining means to receive and position the tip of the optical plug;
    (c) placing an optical collimation device in a generally cylindrical centering device;
    (d) mounting the centering device in the sleeve such that the optical collimation device is in alignment with the tip of the optical plug;
    (e) adjusting the position of the optical collimation device with respect to the centering device such that its optical axis is perpendicular to the plane of reference of the base; and,
    (f) fixedly attaching the otpical collimation device to the centering device.

12. The method according to claim 11 where fixedly attaching the optical collimation device to the centering device comprises the step of inserting an adhesive between the optical collimation device and the centering device after the optical collimation device has been positioned.

* * * * *